US011310864B2

(12) United States Patent
Wang et al.

(10) Patent No.: US 11,310,864 B2
(45) Date of Patent: Apr. 19, 2022

(54) HYBRID TRANSMISSION SCHEME DETERMINATION

(71) Applicant: Nokia Technologies Oy, Espoo (FI)

(72) Inventors: He Wang, Pudong (CN); Wenyi Xu, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/422,712

(22) PCT Filed: Jan. 17, 2019

(86) PCT No.: PCT/CN2019/072168
§ 371 (c)(1),
(2) Date: Jul. 13, 2021

(87) PCT Pub. No.: WO2020/147067
PCT Pub. Date: Jul. 23, 2020

(65) Prior Publication Data
US 2022/0095414 A1 Mar. 24, 2022

(51) Int. Cl.
*H04W 76/40* (2018.01)
*H04L 12/18* (2006.01)
(Continued)

(52) U.S. Cl.
CPC ......... *H04W 76/40* (2018.02); *H04L 12/1836* (2013.01); *H04L 41/082* (2013.01);
(Continued)

(58) Field of Classification Search
CPC ... H04L 67/306; H04L 67/26; H04L 41/5019; H04L 41/082; H04L 12/1836; H04W 28/0284; H04W 76/40
See application file for complete search history.

(56) References Cited

U.S. PATENT DOCUMENTS 8,520,673 B2  8/2013  Chen et al.
9,042,223 B2  5/2015  Korus et al.
(Continued)

FOREIGN PATENT DOCUMENTS

CN  103384996 A  11/2013
CN  104348736 A  2/2015
(Continued)

OTHER PUBLICATIONS

"3rd Generation Partnership Project; Technical Specification Group Services and System Aspects; System Architecture for the 5G System; Stage 2 (Release 15)", 3GPP TS 23.501, V15.1.0, Mar. 2018, pp. 1-201.
(Continued)

*Primary Examiner* — Ajay Cattungal
(74) *Attorney, Agent, or Firm* — Nokia Technologies Oy

(57) ABSTRACT

There is provided a method in a network element of a wireless communication network, the method comprising: receiving a service request from a service provider; initiating determination of a transmission scheme for the service request; obtaining multicast capability information on a plurality of terminal devices and network nodes; obtaining distribution information on the plurality of terminal devices; obtaining traffic load information on the network nodes; based on the multicast capability information, the distribution information, and the traffic load information, determining the transmission scheme for the service request, the transmission scheme including at least one unicast transmission and at least one multicast transmission; and indicating one or more unicast transmitting entities about the at least one unicast transmissions and indicating one or more multicast transmitting entities about the at least one multicast transmissions.

21 Claims, 7 Drawing Sheets

(51) Int. Cl.
  *H04L 67/55* (2022.01)
  *H04L 41/082* (2022.01)
  *H04L 41/5019* (2022.01)
  *H04W 28/02* (2009.01)
  *H04L 67/306* (2022.01)

(52) U.S. Cl.
  CPC .......... *H04L 41/5019* (2013.01); *H04L 67/26* (2013.01); *H04L 67/306* (2013.01); *H04W 28/0284* (2013.01)

(56) References Cited

U.S. PATENT DOCUMENTS

| | | | |
|---|---|---|---|
| 2005/0195764 A1* | 9/2005 | Kawakami | H04H 60/43 370/328 |
| 2012/0172031 A1 | 7/2012 | Marocchi et al. | |
| 2012/0259722 A1* | 10/2012 | Mikurak | G06Q 30/0261 705/26.1 |
| 2013/0254469 A1 | 9/2013 | Miyake et al. | |
| 2014/0064177 A1 | 3/2014 | Anchan | |
| 2014/0359389 A1* | 12/2014 | Seastrom | H04L 1/08 714/751 |
| 2015/0271247 A1 | 9/2015 | Patsiokas et al. | |
| 2016/0014572 A1* | 1/2016 | Vetter | H04W 4/06 370/312 |
| 2016/0255487 A1* | 9/2016 | Abu-Hakima | H04W 4/021 455/404.2 |
| 2017/0272450 A1 | 9/2017 | Krishnamurthi et al. | |
| 2017/0353991 A1 | 12/2017 | Tapia | |
| 2017/0367098 A1* | 12/2017 | Byun | H04W 92/16 |
| 2018/0102965 A1 | 4/2018 | Hari et al. | |
| 2018/0192268 A1 | 7/2018 | Xu et al. | |
| 2018/0199115 A1 | 7/2018 | Prasad | |
| 2019/0068401 A1* | 2/2019 | Johnsen | H04L 45/24 |
| 2019/0379731 A1* | 12/2019 | Johnsen | G06F 9/5027 |
| 2021/0234717 A1* | 7/2021 | Speicher | H04W 28/0252 |

FOREIGN PATENT DOCUMENTS

| | | |
|---|---|---|
| CN | 107852576 A | 3/2018 |
| WO | 2018/042232 A1 | 3/2018 |
| WO | 2018/175974 A1 | 9/2018 |

OTHER PUBLICATIONS

"AI Enables Network Intelligence ZTE AI White Paper", ZTE Corporation, 2018, 38 pages.

Li et al., "Intelligent 5G: When Cellular Networks Meet Artificial Intelligence", IEEE Wireless Communications, vol. 24, No. 5, Oct. 2017, pp. 175-183.

Pérez-Romero et al., "Artificial Intelligence-based 5G Network Capacity Planning and Operation", International Symposium on Wireless Communication Systems (ISWCS), Aug. 25-28, 2015, 5 pages.

Christodoulou et al., "Toward an LTE Hybrid Unicast Broadcast Content Delivery Framework", IEEE Transactions on Broadcasting, vol. 63, No. 4, Dec. 2017, pp. 656-672.

International Search Report and Written Opinion received for corresponding Patent Cooperation Treaty Application No. PCT/CN2019/072168, dated Oct. 16, 2019, 9 pages.

"3rd Generation Partnership Project; Technical Specification Group Services and System Aspects; Multimedia Broadcast/Multicast Service; Architecture and Functional Description (Release 6)", 3GPP TR 23.846, 2.0.0, Sep. 2002, pp. 1-114.

"3rd Generation Partnership Project; Technical Specification Group Service and System Aspects; Security Assurance Specification (SCAS) for the Network Data; Analytics Function (NWDAF) network product class; (Release 17)", 3GPP TS 33.521, V1.0.0, Jun. 2021, 11 pages.

* cited by examiner

HYBRID TRANSMISSION SCHEME DETERMINATION

RELATED APPLICATION

This application was originally filed as a Patent Cooperation Treaty Application No. PCT/CN2019/072168 filed on Jan. 17, 2019, which is hereby incorporated in its entirety.

TECHNICAL FIELD

The invention relates to communications.

BACKGROUND

In a communication network, unicast and multicast transmissions may be used to provide services to user equipment (can be referred to as terminal device also). It may be beneficial to provide solutions that further enhance flexibility of use of unicast and multicast transmissions.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
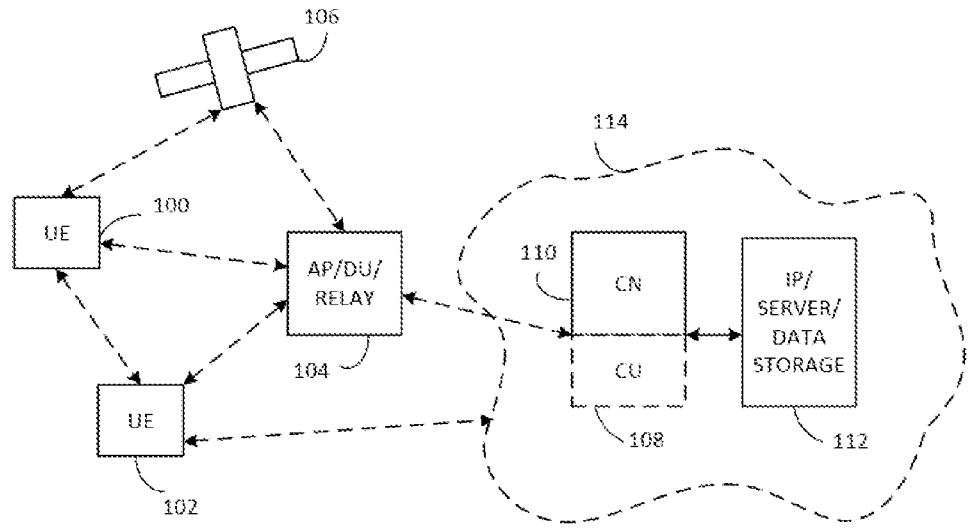
FIG. 1 illustrates an example a wireless communication system to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node 104 (such as (e/g) NodeB) providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Currently a tremendous number of smart devices and objects are embedded with sensors and processors, enabling them to sense real-time information from the environment and reacting accordingly. IoT devices, such as smart vehicles (e.g. smart cars), vehicle sensor(s), wearable devices, different type of sensors, industrial and utility components may be utilized in, for example, the system described in FIG. 1 or a similar system. IoT has become an important driving force for the evolution of the communication network technology, such as 5G. Furthermore, technologies or concepts such as Vehicle to Everything (V2X) and Vehicle to Vehicle (V2V) communications may further increase traffic load in the present and future systems (e.g. system of FIG. 1). Therefore, in general, 5G cellular network may have higher capacity requirements, in the dimensions such as user experienced data rate, traffic volume density, peak data rate, connection density, end to end latency and mobility. All these requirements provide more possibilities for various use cases to build a smarter world. However, the future generation network will face many dynamic and diversified needs, the network itself need to improve flexibility and smartness as well.

Smart may mean that the network may learn from the past and prepare for new but similar cases. Instead of manually inputting and preparing all the parameters needed for various cases which concerns thousands or more parameters, the network may automatically make the best adjustment itself. Besides, by learning from the past, and combining various types of data, network may know how the resources are used and can design better scheduling, decision and resource allocation mechanisms. All these processing target to the higher efficient for the network operation, better Quality of Experience (QoE) for the end users, and more profits for the service providers and network operators.

Accurate content pushing service may be enable the service providers to push the right content to the right users which is also known as intelligent content pushing or personalized content pushing. One example implementation of the content pushing service may be V2X content pushing. For example, smart vehicles may comprise multiple sensors equipped in one vehicle to collect the vehicle conditions and surrounding environment information. It is possible that all of these sensors in the vehicle may connect to the network and interact the data information with vehicle service center to complete designed services. For example, there may be a need to update or upgrade firmware and/or software of the sensors. For example, the update or upgrade (hereinafter upgrade) may be provide the sensor a new feature or bug correction. Both may improve safety of traffic, for example. As there can be a lot vehicles each comprising one or more sensors, it may be beneficial to provide solutions that enable massive amount of data to be pushed to the sensors at proper time and at proper place via the communication network (e.g. network of FIG. 1). There are some characteristics for this type of data transmission service to the communication network such as:

The number of target audience, i.e. sensors, will be relatively large.
The data transmission volume may be quite high.
Due to the vehicle mobility the target audience (i.e. the sensors) would also be mobile.
The data for an upgrade may be the same for a group of target audience.
The completion time of the upgrade package data transmission would be a definite time such as a deadline time.
In general, it would be the wireless transmission between the target audience in the vehicle and the network. For example, a vehicle service center may provide the upgrade to be transmitted by one or more network nodes to the plurality of sensors.

Furthermore, from the content and user perspective such a service may be an accurate content pushing service in which target users receive contents data at a definite time. This is content specific and user centric. That may mean that different instance of this service would have the different requirements on the content, user and time. For vehicle sensors firmware/software upgrading use case, different brands of automobile companies may launch different upgrading services at the different time for different models of cars.

From the viewpoint of communication network, the problem may thus be how to design an enhanced or optimized transmission solution to transfer the data to these target users in an effective manner.

Considering that in general the number of sensors or vehicles that may need to be upgraded will be larger, one solution is multicast transmission. However, currently in communication network such as 4G LTE, the multicast service is simply supported as a Multimedia Broadcast Multicast Service (MBMS) service with some pre-configured fixed mode. The transmission region, i.e Multicast Broadcast Single Frequency Network (MBSFN) area is relatively fixed. It is decided by the service area and network node capabilities. However, due to the nature mobility properties of automobiles, the distribution of users in this upgrade business may be quite dynamic. Therefore, it may be that all of the target devices are not located within any of a plurality of MBSFN areas. Therefore, previous simple and single multicast transmission method without considering the user's mobility pattern and/or trajectory and other network node and/or user profile information may cause invalid (e.g. old data) data sending in some areas. It is also possible that some users are never inside said MBSFN area(s), and thus cannot receive the transmitted data. Such situation could cause potential problems in traffic safety, for example.

Therefore, there is proposed a hybrid multicast-unicast solution which may be used to provide an enhanced content pushing service for terminal devices, such as vehicle sensors and other vehicle devices. Multicast may be understood as a transmission from one entity to a plurality of entities (but not necessarily to all entities in the area as in broadcast) whereas unicast may be a transmission one entity to another. These terms, individually, are known by the skilled person.

Figure 2:
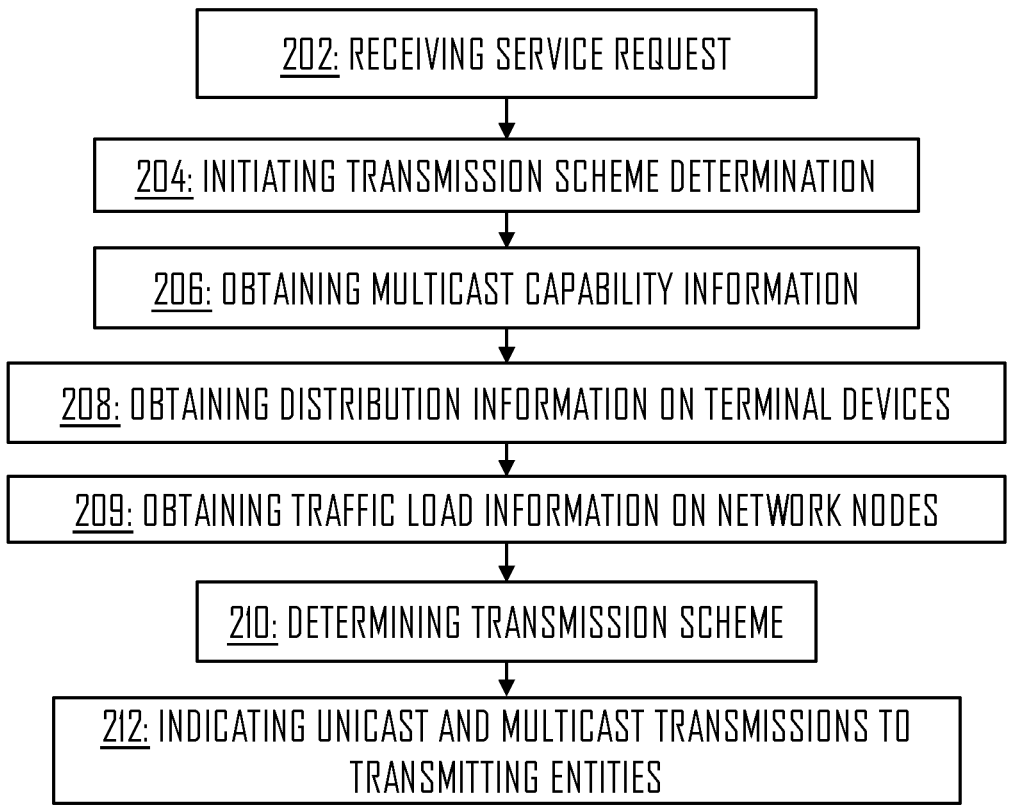
FIG. 2 illustrates a flow diagram according to an embodiment.

FIG. 2 illustrates a flow diagram according to an embodiment. Referring to FIG. 2, a method in a network element of a wireless communication network is provided, the method comprising: receiving a service request from a service provider (block 202); initiating determination of a transmission scheme for the service request (block 204); obtaining multicast capability information on a plurality of terminal devices and network nodes (block 206); obtaining distribution information on the plurality of terminal devices (block 208); obtaining traffic load information on the network nodes (block 209); based on the multicast capability information, the distribution information, and the traffic load information, determining the transmission scheme for the service request, the transmission scheme including at least one unicast transmission and at least one multicast transmission (block 210); and indicating one or more unicast transmitting entities about the at least one unicast transmissions and indicating one or more multicast transmitting entities about the at least one multicast transmissions (block 212).

The network element discussed with respect to FIG. 2 may be, for example, a network node or comprised in a network node (e.g. network node 104) or in some other network entity. In one example embodiment, the network element may be a Big Data Process Function Entity (BDPFE). It is noted that such network element may be a virtual network function (VNF) in some implementations. This could mean that functionalities of the BDPFE may be shared between different physical entities of the communication system. Said method may be applicable in the system of FIG. 1, for example.

In an embodiment, the distribution information comprises trajectory information on the plurality of terminal devices. For example, the trajectory information may indicate trajectories of the terminal devices, such as predicted trajectories and/or predicted future location(s). According to some example embodiments, the trajectory information may indicate and/or comprise mobility prediction information on the plurality of terminal devices. Essentially, such information may indicate or try to estimate location(s), trajectory, and/or velocity/or speed of the terminal devices. This may help the BDPFE 300 in determining the transmission scheme based on, for example, the future locations, traffic load information and capability information.

The terminal devices discussed with respect to FIG. 2 may be, for example, sensor devices such as devices 100, 102. Therefore, for example, some devices 100, 102 may share same trajectories (i.e. comprised in the same vehicle) or have different trajectories. Trajectory information may indicate, for example, predicted trajectories of the terminal devices. In an embodiment, the plurality of terminal devices comprises vehicle sensor devices, such as devices 100, 102.

As noted one use case for such content pushing may be the firmware or software upgrade. Therefore, in an embodiment, the service request is a firmware updating request or a software updating request. Thus, the service may be requested regarding a firmware or software update that needs to be pushed to the terminal devices.

Figure 3:
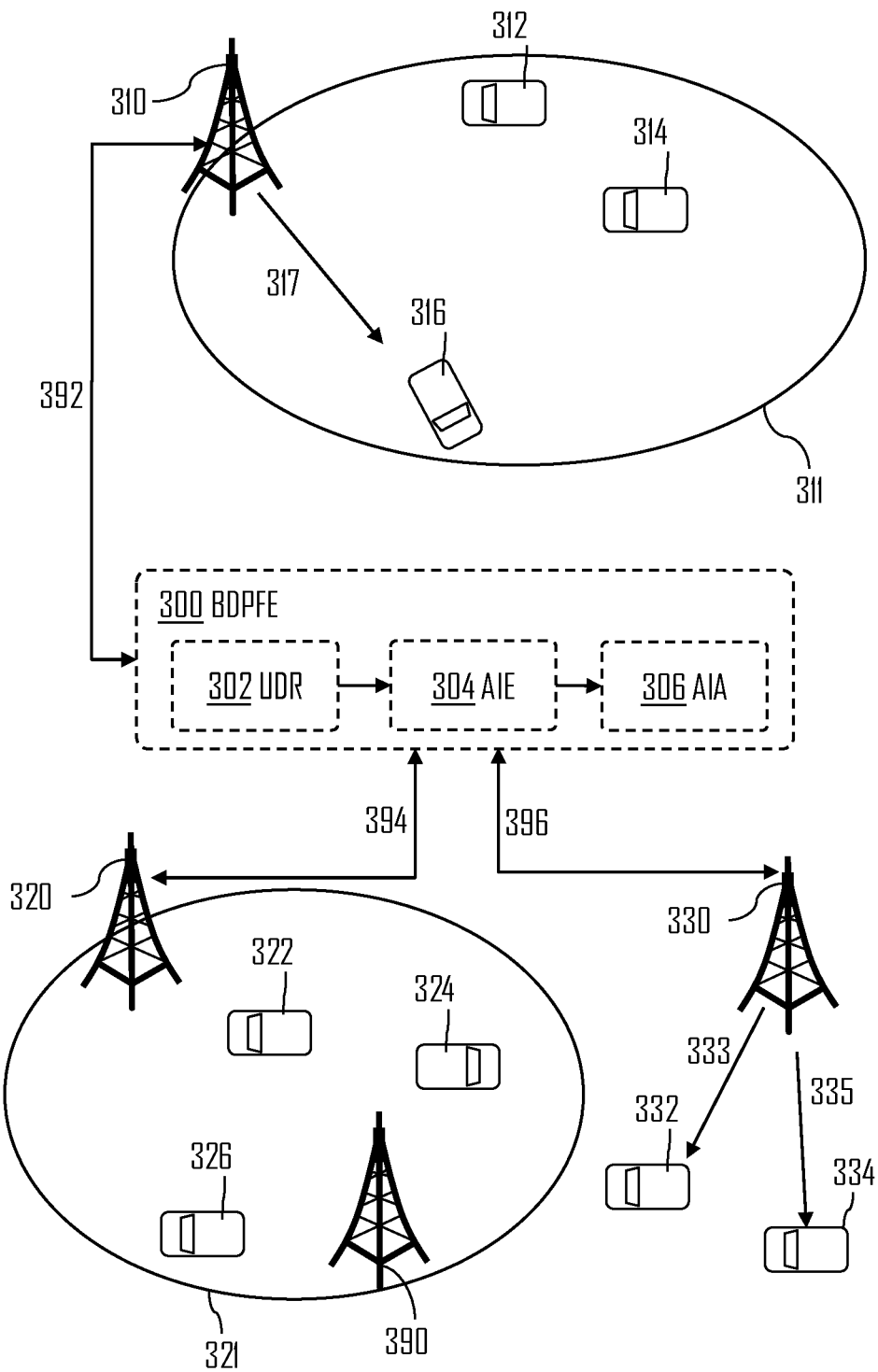
FIG. 3 illustrates an example embodiment.

So, in general, the transmission scheme may comprise multiple unicast and multiple multicast transmission. Let us look at FIG. 3 indicating an embodiment. Referring to FIG. 3, the network element performing the method of claim 2 is shown as BDPFE 300. BDPFE 300 is used as an example, but the embodiments may be applicable to other network entities also. In the situation of FIG. 3, the transmission scheme may comprise multicast transmission in multicast areas 311 and 321, and unicast transmissions 317, 333, 335.

Regarding the multicast transmissions, these may be performed by network nodes 310 and 320 in their respective multicast areas 311, 321. So, terminal devices 312, 314 and 322, 324, 326 may receive the transmission (e.g. the upgrade) as multicast transmission.

Regarding unicasts transmissions, terminal devices 316, 332, 334 may be updated utilizing the unicast transmissions 317, 333, 335.

Both unicast and multicast transmissions may be for fulfilling the same service request e.g. in the case of FIG. 3. As noted above, the transmission scheme may be determined at least on the basis of multicast capability information and distribution information.

Firstly, multicast capability information may indicate multicast capability of the terminal devices 312, 314, 316, 322, 324, 326, 332, 334 and/or the network nodes 310, 320, 330. For example, in the example of FIG. 3, such capability information may indicate that network nodes 310, 320 and/or their cells are multicast capable whereas network node 330 may not be multicast capable. Further, such information may indicate that at least devices 312, 314, 322, 324, 326 are multicast capable. Therefore, these devices may be served using multicast transmissions, and thus the BDPFE 300 may indicate to network nodes 310, 320 via connections 392, 394 the multicast transmissions. However, as device 316 may not be multicast capable, the network node 310 may also need to perform unicast transmission 317 to the device 316. The unicast transmission may also be indicated by the BDPFE 300 to the network node 310. Even further, as network node 330 may not be multicast capable, the BDPFE 300 may indicate or request (e.g. via connection 396) the network node 330 to perform the unicast transmissions 333, 335 to the devices 332, 334. It is noted that devices 332, 334 may or may not be multicast capable.

So, as indicated, the BDPFE 300 may indicate the different multicast and unicast transmission regarding the same service request (e.g. upgrade request) to the network nodes 310, 320, 330. It is possible that there is one or more network nodes 310, 320, 330 to which the indication is made. The indication may be understood as an indication or request to perform the transmission according to the transmission scheme determined by the BDPFE 300.

Furthermore, in addition to the capability information, the determination may be based on distribution information on the terminal devices 312, 314, 316, 322, 324, 326, 332, 334. That is, the distribution information may comprise at least location of the terminal devices 312, 314, 316, 322, 324, 326, 332, 334. Also, the BDPFE 300 may utilize location data on the network nodes 310, 320 and their respective multicast areas 311, 321.

In an embodiment, the distribution information indicates trajectories of the terminal devices 312, 314, 316, 322, 324, 326, 332, 334. For example, the trajectories may be predicted trajectories of the terminal devices.

The terminal devices 312, 314, 316, 322, 324, 326, 332, 334 may be, for example, sensor devices and/or comprise one or more sensors. For example, the terminal devices may be comprised in one or more vehicles and may thus be, for example, vehicle sensors. That said, each vehicle may comprise one or more sensors.

So, for example, even if a terminal device would be within a multicast area, but is expected to move outside the area e.g. within a certain time limit, the BDPFE 300 may indicate the respective network node to perform unicast transmission to that terminal device regarding the service request. For example, if device 316 is multicast capable, but is moving away from area 311 e.g. so that the multicast transmission would not reach the device 316, the BDPFE 300 may determine the transmission scheme so that the network node 310 performs the unicast transmission 317 to the device 316.

In an embodiment, the distribution information comprises location information on the plurality of terminal devices. Thus, the current and/or future predicted locations of the terminal devices may be known.

Referring still to FIG. 3, according to an embodiment, one or more of the multicast areas 311, 321 may be associated with one or more network nodes. Example of this is given with respect to multicast area 321 that may be served by network nodes 320 and 390 (it may also be connected to BDPFE 300 although not shown in the Figure). The network nodes 320, 390 may jointly participate in the same multicast transmission. Hence, it is noted that the same multicast transmission may be performed by a plurality of network nodes. This may, for example, improve cell edge performance for the multicast transmission. As noted, the multicast areas may be MBSFN areas as defined in 3GPP LTE specifications. Similar or same structure may be utilized in future networks, such as 5G networks. It is also noted that the multicast area 311 may be associated with more than one network node although such is not shown in the Figure. However, only one network node may also suffice.

According to an embodiment, the network element performing the method shown in FIG. 2 (e.g. BDPFE 300) utilizes Big Data and/or artificial intelligence in determining the transmission scheme. This may mean that one or more learning algorithms are utilized in determining the transmission scheme. For example, such learning algorithms may comprise utilizing neural network function(s) or similar learning functionalities. Some examples are given in FIG. 3 showing a Unified Data Repository (UDR) 302, an Artificial Intelligent Engine (AIE) 304 and an Artificial Intelligent Actuator (AIA) 306. One or all of the described modules 302, 304, 306 may be used. Further, there can be one or more of each of the modules 302, 304, 306. So, the optimized hybrid multicast-unicast transmission solution may comprise determination of a transmission scheme that utilizes Big Data analysis to determine the multicast group and region, and further utilizes unicast transmissions as a supplement in the transmission scheme. Multidimensional, cross-layer, historical and predicative information can be used to optimize the network processing through the Big Data and artificial intelligence methods.

The BDPFE may have an interface to the current network elements (e.g. elements shown in FIG. 1 and/or in FIG. 4) to collect information and to perform the Big Data analysis. This can make the current network more intelligent to deal with the service requests. As noted above, according to an embodiment, the BDPFE comprises three components: UDR 302, AIE 304 and AIA 306, which deal with data storage, data analysis and network execution decision arrangement respectively. These three components may be designed loosely coupled, and connected with each other through service-like interfaces. BDPFE is flexible to modify and can adapt to changes in the communication network.

UDR 302 may be part of 5G architecture. UDR 302 may focus on static information and may collect data related to subscriber information, policy and network functions (NF). UDR may be a heterogeneous data access point which collects, cleans (e.g. processes and removes redundant data) and stores different types of data from network. The data it gathers may relate to users, services, networks and external information (e.g. environment, social). UDR may provide interfaces that allows NF to push data for their storage, as well as to pull data from those NF by the UDR 302 itself.

AIE 304 may be an intelligent middleware that may contain both basic Artificial Intelligent (AI) modules and specific modules based on required tasks, such as to provide services related to analyzing, predicting, classifying, detecting anomalies and reasoning. It may be flexible to extend and modules can exchange information easily. Furthermore, it may be a case-free tool which can be used by different NFs. It may communicatively connect to both the UDR 302 and AIA 306.

AIA 306 may be a connector between the network and data layer. The AIA 306 may translate network requests and selects relative AIE modules for the task. It may also receive results from AIE and provide assisted information for network to arrange resources and to make strategic decisions. It may provide interfaces and services for NFs to perform request, and may also have a specific interfaces to interact directly with a Session Management Function (SMF) and Radio Access Network (RAN).

Let us then consider an example of how the BDPFE 300 may work. AIA 306 may receive a service request (e.g. update request regarding software or firmware) from the communication network (e.g. some NF of the communication network) and translate the service request into AIE 304 understandable request. Afterwards, the AIE 304 may request UDR 302 to obtain necessary data such as a capability information and/or distribution information. Further, the AIE 304 may obtain the data from the UDR 302, process it and transmit the data to the AIA 306 to help the AIA 306 in its decision making process (i.e. determining the transmission scheme based on the service request and said information obtained from the UDR 302).

As we noted earlier, the BDPFE 300 may utilize capability information, traffic load information, and distribution information in determining the transmission scheme for the service request. Moreover, the information based on which the transmission scheme is determined may comprise service requirement information (e.g. service identifier information, target user information and/or service time request information), network node profile information (e.g. capability information, coverage information, and/or traffic load information), and/or user profile information (e.g. capability information and/or mobility patter information which may be similar or same as distribution information). In general, information about the required service, capability information (both the network node and terminal devices), network node coverage and traffic load information, and terminal device location and trajectory information may be used in determining the transmission scheme. However, in some cases not all of the described information is needed, but may improve the determination accuracy.

The described information and/or data may be continuously collected and stored in UDR 302 from other network elements. The AIE 304 may continuously process data to obtain and update user profiles (e.g. mobility pattern or distribution). So the Big Data analysis may be performed in AIE 304, wherein the Big Data analysis may comprise trajectory prediction and/or network load prediction to name a few examples.

In an embodiment, the BDPFE 300 continuously collects and stores the capability information and distribution information; updates user profiles of the terminal devices in a database based on the collected information; and utilizes the user profiles in determining the transmission scheme.

After the service request is received from the network by the AIA 306, the AIA 306 may begin to implement the transmission scheme determination procedure to ensure the successful transmission of the data related to the service request.

So, the BDPFE 300 may utilize distribution information on the terminal devices in determining whether the terminal devices can be provided the service via multicast transmission. The BDPFE 300 may further utilize information on the multicast regions in the determination. As disclosed above, the distribution information may include trajectory or mobility trajectory information on the terminal devices. The predicted trajectories may be obtained via the Big Data analysis. Further, unicast transmission(s) can be used if multicast is not possible for a particular terminal device(s).

Moreover, the same service request may comprise transmissions in a plurality of multicast areas and one or more unicast transmission. For example, network node coverage and distribution information on the terminal devices may be used to determine the area(s).

According to an embodiment, the method comprises causing the network node to apply multicast transmission in a cell provided by the network node if the number of terminal devices in the cell exceeds a threshold, otherwise causing the network node to apply one or more unicast transmission. Basically, the BDPFE 300 may determine the transmission scheme such that multicast transmission is performed if the number of terminal devices in the multicast area (e.g. cell area) exceeds the threshold. For example, if there is only one terminal device, unicast transmission may be performed. However, the threshold number may be some other number than one (e.g. two, three, ten, or hundred). Utilizing said threshold, the BDPFE 300 may ensure that benefits are obtained from the multicast transmission or unicast transmissions.

In step 209 of FIG. 2, traffic load information may be obtained by the BDPFE 300 or similar entity. The traffic load information may indicate predicted traffic load of the network nodes, such as network nodes 310, 320, 330, 390. This may mean that the traffic load information indicates future estimated traffic load in the multicast area(s) and/or cell(s). For example, the traffic load information may indicate how much transmission capability is used and/or left in a cell and/or in a multicast area. The traffic load information may be used, for example, to determine the transmission scheme. One example is given below.

According to an embodiment, the BDPFE 300 configures transmission times of the at least one unicast transmission and/or at least one multicast transmission based on the traffic load information on the network nodes. So, the actual transmission time of each multicast and/or unicast transmission can be different according to traffic load information of the transmitting entity. For example, if a traffic load in a network node is higher than in another network node, the former network node may be configured to perform transmission later than the latter network node. Later may mean, for example, after the traffic load decreases below a certain threshold or is equal to said threshold. The BDPFE 300 may additionally take into account time requirement of the service request in determining the transmission times for the unicast transmission(s) and/or multicast transmission(s). This way scarce network resources may be used in a more effective manner.

In an embodiment, the transmission times of the unicast transmission and the multicast transmission are different (i.e. they are configured to be different by the BDPFE 300 and the transmission scheme may so indicate). This may be caused, for example, by different traffic load at the entities performing the transmission(s).

As noted above, the BDPFE 300 may indicate the determined transmission scheme to the entities that perform the transmission(s). These entities may comprise, for example, network nodes 310, 320, 330, 390. These network nodes may be similar as network node 104 of FIG. 1, for example. Further, the BDPFE 300 may, in addition to the indication, determine whether or not the data transmission(s) have been successful. If not, the BDPFE 300 may require a re-transmission of the data related to the service request, for example.

Figure 4:
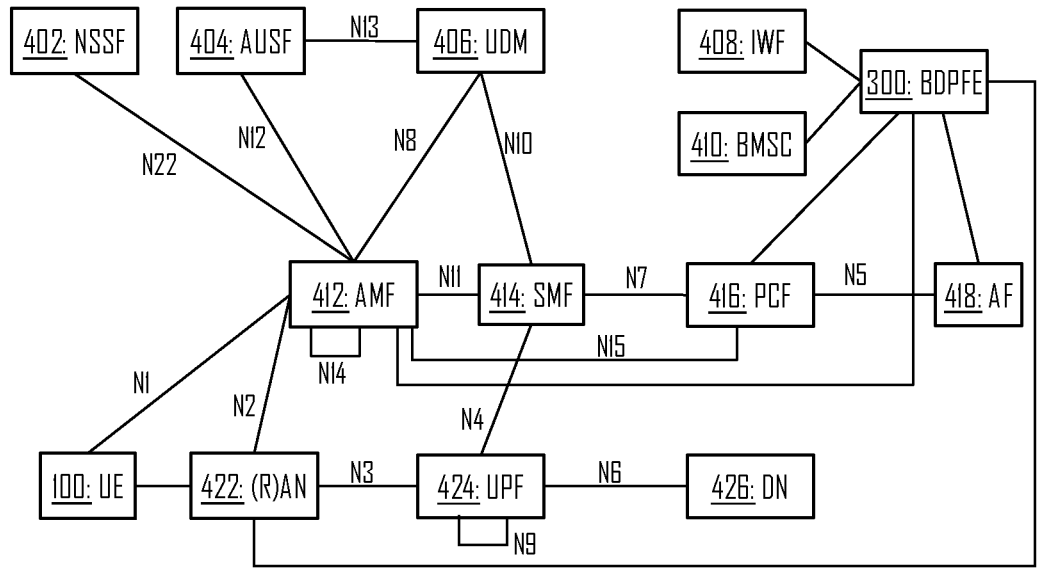
FIGS. 4, 5, 6, 7, and 8 illustrate some embodiments.

FIG. 4 illustrates an embodiment showing connection of the BDPFE 300 to other network entities. Referring to FIG. 4, different network (e.g. 5G network) functions and their connectivity with each other are shown. The network functions may include: Network Slice Selection Function 402 (NSSF), Authentication Server Function 404 (AUSF), Unified Data Management 406 (UDM), Inter Working Function 408 (IWF), Access and Mobility Management function 412 (AMF), Session Management function 414 (SMF), Policy Control Function 416 (PCF), Application Function 418 (AF), and User plane function 424 (UPF). The network functions may comprise one or more of the described functions. Hence, not all are necessarily required.

Further, the network may comprise Broadcast Multicast Service Center 410 (BMSC), Radio Access Network 422 (RAN) (or simply Access Network), Data Network 426 (DN), one or more UEs 100, and the BDPFE 300 (or possibly more than one BDPFE).

Different interfaces and connections are shown in FIG. 4 i.e.: N1 between UE 100 and AMF 412; N2 between RAN 422 and AMF 412; and so on. These interfaces are known by the skilled person. However, totally new connections between BDPFE 300 and IWF 408, BDPFE 300 and BMSC 410, BDPFE 300 and PCF 416, BDPFE 300 and AF 418, and BDPFE 300 and RAN 422 are shown in the Figure. However, there can be other interfaces too.

To be more precise, the BDPFE 300 may have the interface with AF 418 for receiving sensor firmware/software upgrading service request from service provider.

Interface with AMF 412, UDM 406 and RAN 422 may be used, by the BDPFE 300, to collect needed data as mentioned above such as user subscription information (e.g. distribution information), capability information, and/or traffic load information.

Interface with IWF 408 may be used to obtain user group information related to the received sensors firmware/software upgrading service request. This may be the maximum users range required from the service level that need to perform this upgrading.

Interface with BMSC 410 may be used for indicating the multicast transmissions for the transmitting entities. Actually, the BMSC 410 may be responsible for the multicast transmission(s), and further request the different network nodes to perform needed multicast transmissions.

Interface with PCF 416 may be used to indicate unicast transmissions similarly as with BMSC 410 and multicast transmissions. So, the PCF 416 may be responsible for the unicast transmission(s), and further request the different network nodes to perform needed unicast transmissions.

Figure 5:
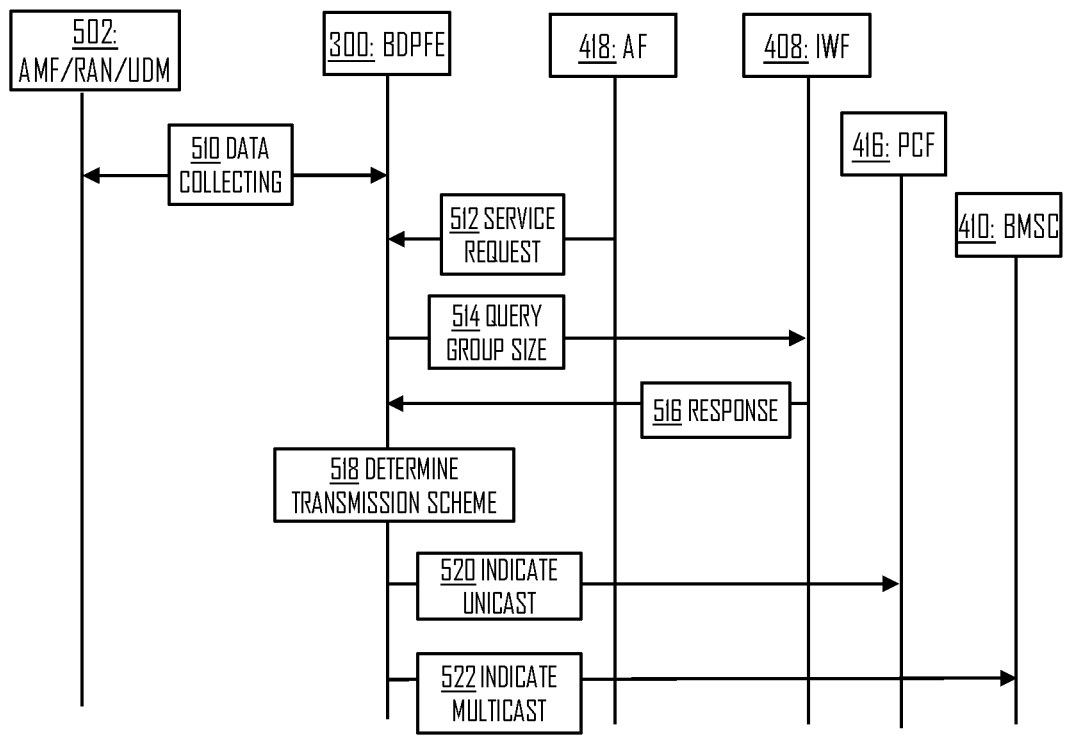

Let us then look at FIG. 5 that illustrates a signal diagram according to an embodiment. Referring to FIG. 5, block 510 illustrates data collecting process. That is, the BDPFE 300 (and more precisely the UDR 302) may collect data from the network entities 502 (e.g. AMF 412, RAN 422, and/or UDM 406). The data collecting process may be a continuous process. BDPFE 300 may configure the data collecting requirements for corresponding network entities as required. Then the related network entities may report the data according to the configuration. So there may be a two-way interaction between BDPFE and corresponding network entities 502. The collected data may comprise, for to example, capability information, coverage information, traffic load information, and/or any of the data indicated above or in FIG. 7. Based on the collected data, the Big Data analysis may continuously perform the data mining to prepare some useful assistance information for the subsequent decision making processing. For example, two types of profiles may be generated, i.e. Network Node Profile and User Profile including the multicast supporting capability, user mobility prediction, traffic load statistic and prediction, and/or coverage information.

In block 512, the BDPFE 300 may receive a service request from the AF 418.

In an embodiment, the BDPFE 300 may query, in block 514, group size from the IWF and receive a response in block 516 indicating the group size. This group size may indicate the maximum number of terminal devices or users that can participate in the service request. In other words, how many terminal devices can be updated or upgraded with the same service request. Based on the group size information, the BDPFE 300 may determine the terminal devices that are to be updated or upgraded. So, the number of terminal devices that are to be updated or upgraded, using the described multicast and unicast hybrid transmission scheme, may not exceed the indicated maximum group size.

In block 518, the BDPFE 300 may perform the determination of the transmission scheme as indicated above. Based on the determined transmission scheme, unicast and multicast transmission may be indicated to PCF 416 and BMSC 410 respectively in blocks 520 and 522.

That is, according to the determined transmission scheme, multicast indication (block 522) is sent to BMSC 410 to initiate the subsequent multicast data sending processing flow, and unicast indication (block 520) is sent to PCF 416 to initiate the subsequent unicast processing flow. The indication(s) may be transmitted via Control Plane signaling, for example. The multicast indication signaling to BMSC 410 may comprise service request information, multicast area information, and/or transmission time information, to name a few example. The unicast indication signaling to PCF 416 may include the service request information, network node information, user or terminal device information, and/or transmission time information. This information may be used to guide subsequent transmission processes. In short, the BDPFE 300 may indicate directly and/or via one or more entities (e.g. PCF and/BMSC) the network nodes about the multicast and/or unicast transmissions. Therefore, the entity that should perform a transmission is informed about the transmission. So, for example, a network node that performs unicast transmission may be indicated about that specific unicast transmissions, but not about other unicast transmission(s) and multicast transmission(s).

Figure 6:
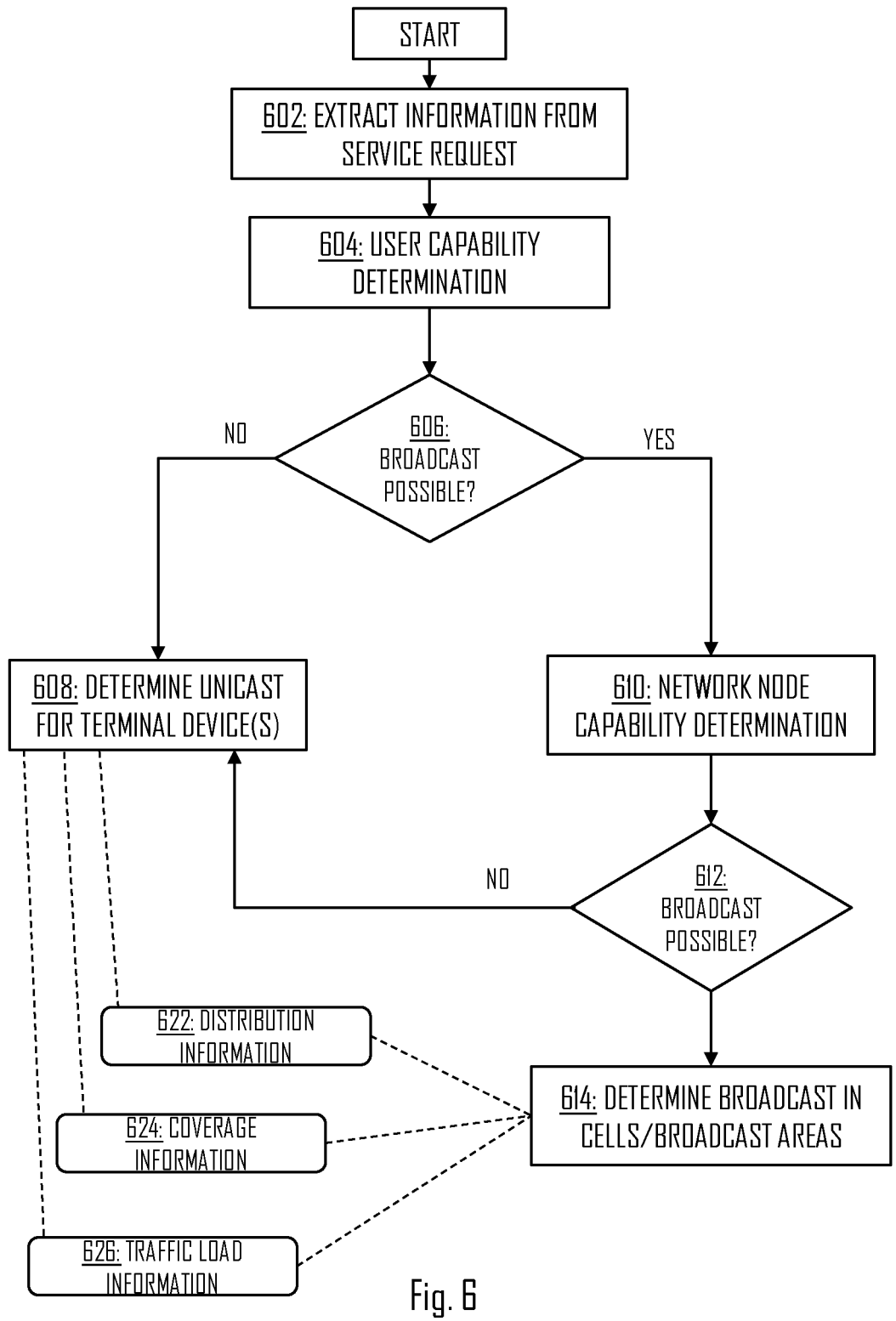

Let us now look at FIG. 6 illustrating the transmission scheme determination according to an embodiment. In block 602, the BDPFE 300 may extract information from the service request (e.g. received in block 512). This information may comprise, for example, information on the terminal devices that need to be served (e.g. updated) and/or time requirement for the service request.

In block 604, user capability information may be obtained. For example, this may be based on the generated or updated user profiles (i.e. said user profiles may be associated with sensors). Based on the user capability information, the terminal devices may be grouped into two categories: multicast and non-multicast. Basically, for multicast terminal devices multicast may be possible and for non-multicast multicast may not be possible. Non-multicast may refer to non-MBSFN capable.

In block 606, if the terminal device is not multicast capable, the process may continue to block 608 regarding that terminal device. Otherwise, the process may continue to block 610.

In block 608, unicast transmission(s) for the non-multicast terminal device(s) may be configured and later indicated to the entities performing the unicast transmission(s). Determining unicast transmission(s) for each non-multicast terminal device may involve terminal device specific determination. Hence, for example, distribution information 622, coverage information 624, and/or traffic load information 626 may be taken into account when determining unicast transmission for a terminal device. The BDPFE 300 may use Big Data analysis results of user mobility prediction, base station coverage information and traffic load prediction results to determine unicast performing network node, target terminal device, and the transmission time. The mobility prediction results and network node coverage information may help to select the proper network node for the users to do the unicast data sending. For the transmission time determination, the basic principle may be to choose the time when the network node traffic load is low to maximize the use of network resource. The deadline (i.e. time requirement) of the service request may need to be satisfied and taken into account when determining the transmission time.

In block 610, multicast capability of the network nodes may be determined. In block 612, if multicast is possible, the process may continue to block 614, and if not the process may continue to block 608. So, even if a terminal device is capable of multicast reception, the network node or nodes able to transmit to said terminal device may not be. In such case, unicast may still be needed. However, it is possible that two or more network nodes are able to transmit to the terminal device. In such case it may suffice that at least one of the network nodes is multicast capable for the process to continue to block 612.

In block 614, multicast transmission(s) are determined, by the BDPFE 300, in cells and/or multicast areas based at least on the information of block 622, 624, and/or 626. Multicast can be used for terminal devices that are multicast capable and situated within at least one multicast area. BDPFE 300 may use Big Data analysis results of user mobility prediction, base station coverage information and traffic load prediction results to determine multicast performing network node, and the transmission time. It may be possible to generate multiple multicast groups for one service request. Each multicast group may be associated with a respective multicast area. The transmission time for each multicast group may be different. It is also possible that two or more multicast groups are associated with the same multicast area. For example, two or more multicast transmission related to the same service request may be performed within the same multicast area at different times.

In an embodiment, the number of terminal devices in each multicast group may need to be higher than a threshold. That is, this way multicast may bring benefits compared to unicast transmissions.

Determining the scope and time of multicast is a dual optimization problem. That is, the distribution of users may be dynamic. So, the transmission time may be determined on the premise of seeking as many users as possible in a multicast area. Hence, traffic load may actually be a secondary condition in the transmission time determination. This way multicast may provide most benefits as it is received as many terminal devices as possible.

Furthermore, if some terminal device(s) cannot be mapped into any multicast group, the BDPFE 300 may determine unicast transmission(s) for these terminal device(s).

Figure 7:
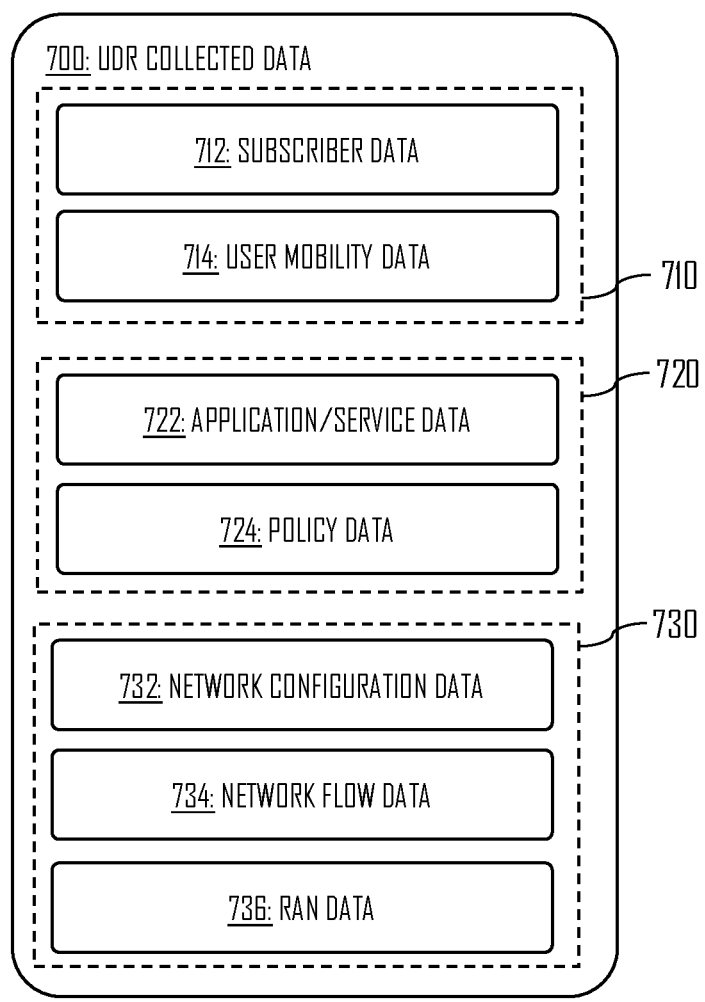

FIG. 7 illustrates collected data by the BDPFE 300 according to an embodiment. As noted in the Figure, UDR 302 may collect the data 700. The data 700 may comprise subscribed data 712, user mobility data 714, application/service data 722, policy data 724, network configuration data 732, network flow data 734, and/or RAN data 736. Category 710 may refer to user data, category 720 may refer to service data and category 730 may refer to network data.

Subscribed data 712 may be obtained, for example, from Home Subscriber Server (HSS) and/or UDM 406.

User mobility data 714 may be obtained, for example, from Mobility Management Entity (MME) and/or AMF 412.

Application/service data 722 may be obtained, for example, from AF 418.

Policy data 724 may be obtained, for example, from Policy and Charging Rules Function (PCRF) and/or PCF 416.

Network configuration data 732 may be obtained, for example, from Network Exposure Function (NEF).

Network flow data 734 may be obtained, for example, from RAN Artificial Intelligent Data Actuator (RAIDA).

RAN data 734 may be obtained, for example, from RAIDA.

Based on the collected data, information such as distribution information and/or capability information may be determined by the BDPFE 300.

The UDR 302 may collect and store data continuously. For example, the data collection process may comprise collecting required data, such as session start time, user id, cell id, uplink data, and/or downlink data. Once the required data is registered between the network function and UDR, network function can use RESTful protocol to send data to the UDR 302. The received data stream may be re-indexed and stored in UDR 302.

The received data, by the UDR, may be used by the AIE 304 to predict the user mobility as well as traffic load information and help for the final network arrangement decision. The AIE may predict the traffic load of network nodes in order to increase efficiency of the network. In order to predict the traffic load, AIE 304 may receive data from UDR 302. For example, the AIE 304 may comprise traffic modeling module that may use an Recurrent neural networks (RNN)/Long-short term memory (LSTM) model (or some other neural networks model) which may require input data, such as time, time granularity, day, week, uplink (UL) data, downlink (DL) data, and/or flow window size.

Then, the data may be separated into training, validation, and test data sets (e.g. for 10 blocks data, the ratio can be 5:2:3), the data may be rearranged into traffic matrix to fit the AI model.

Figure 8:
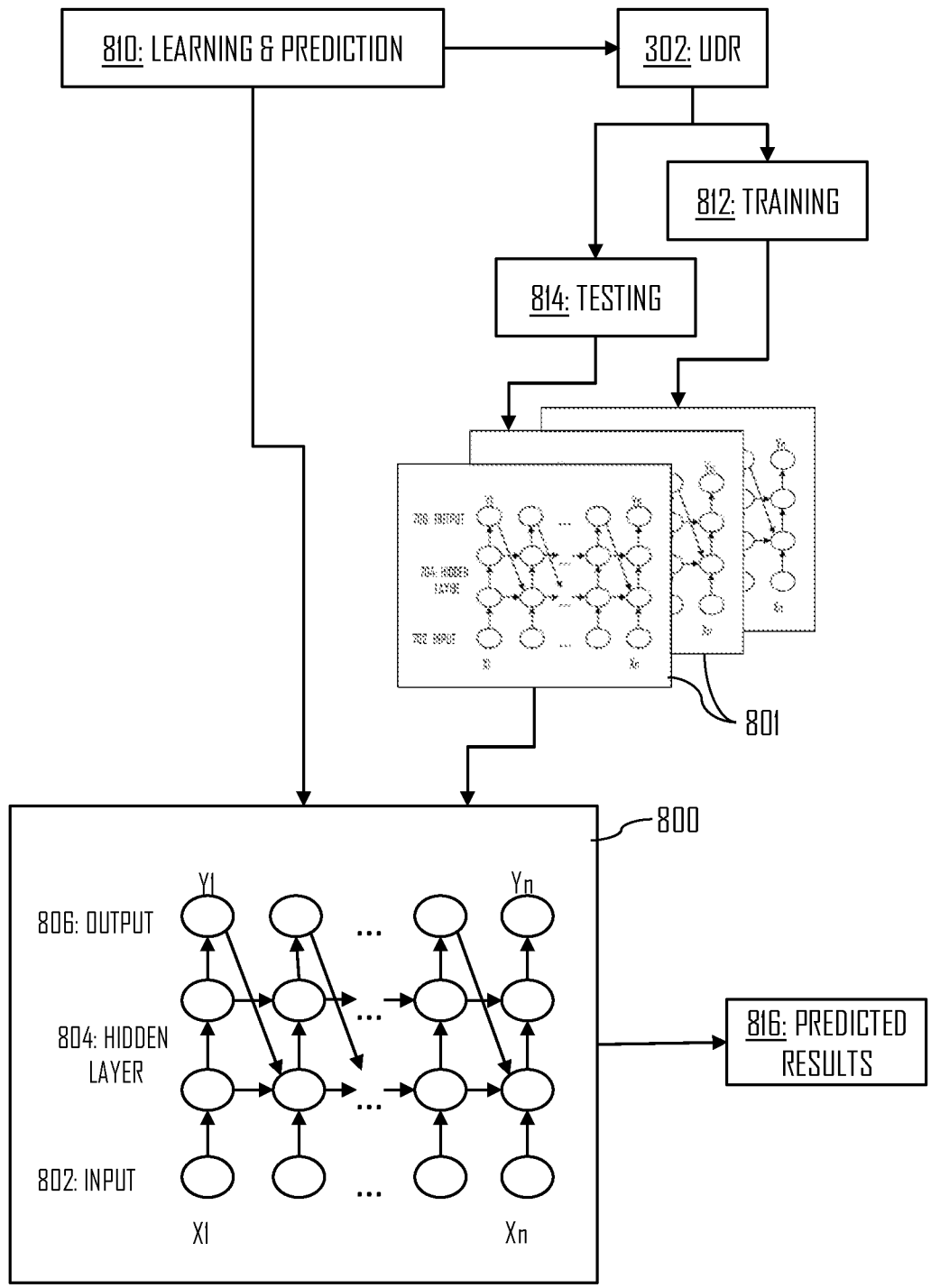

An example algorithm is given in FIG. 8 showing the learning and/or prediction step 810 that provides input (e.g. data) to the UDR 302. Training and/or testing steps may be performed by the BDPFE 300 to obtain the test models 801. From the test models 801, the used model (i.e. data model) 800 may be selected, and based on the selected model 800 the BDPFE 300 may predict results such as user mobility pattern.

In input layer 802, traffic data may be passed by the assigned sliding window (e.g. 10, from X1 to Xn, n being a positive integer number) to the hidden layers 804. The hidden layer 804 may receive previous hidden layer data as an input and provide output (e.g. weighted output) to the next hidden layer both vertical and horizontal. The evaluation metrics may be for instance, a Mean Squared Error (MSE) function. During training period (see models 801), the best weights for each link may be tried to be revealed in order to generate the final model (i.e. 800). Output is shown with reference sign 806.

For the input training data, which has been sliced by a window size Sw, given the sliced data $X_t$ ($x_t, x_{t+1} \ldots x_{t+sw}$) and input node is a neuro node with:

$$i_t = f(w_i * X_t + b_i)$$

where f is an activate function, f can be a standard logistic sigmoid function such as f(x)=1/(1+e−x), and $w_i$ and $b_i$ may be parameters to be learnt.

Since the traffic load model is a time series, the predicted output may influence the sequenced data. This node $C_t$ is linked both to $C_{t-1}$ and $i_t$, thus:

$$C_t = g_t * C_{t-1} + k_t * i_t$$

Where $g_t$ and $k_t$ are the influence weights for t.

And output can be a fully connected linear: ot=σ(wo·Ct+bo).

Note that wi, wo, bi, bo may be weights, and bias parameters which should be learnt, the vector size may correspond to the input and output vector size.

To choose the best model, different model types may be determined and trained separately (see blocks 812 and 814 and the training models 801), afterwards, the final model (i.e. model 800) may be selected by the test process, which may later be used in the prediction of block 816.

For example, the following parameters may be used in determining the models 801 and/or 800: Train data size, Test data size, Data time granularity, Windows size of input data, Number of hidden layer, Number of nodes in each layer, Network structure, Initial values for the nodes parameters (W,b), Activated function f, Loss function, Optimization function, Learning rate, Training epoch, Number of models to generate and train, and/or Decision strategies for the final model.

Figure 9:
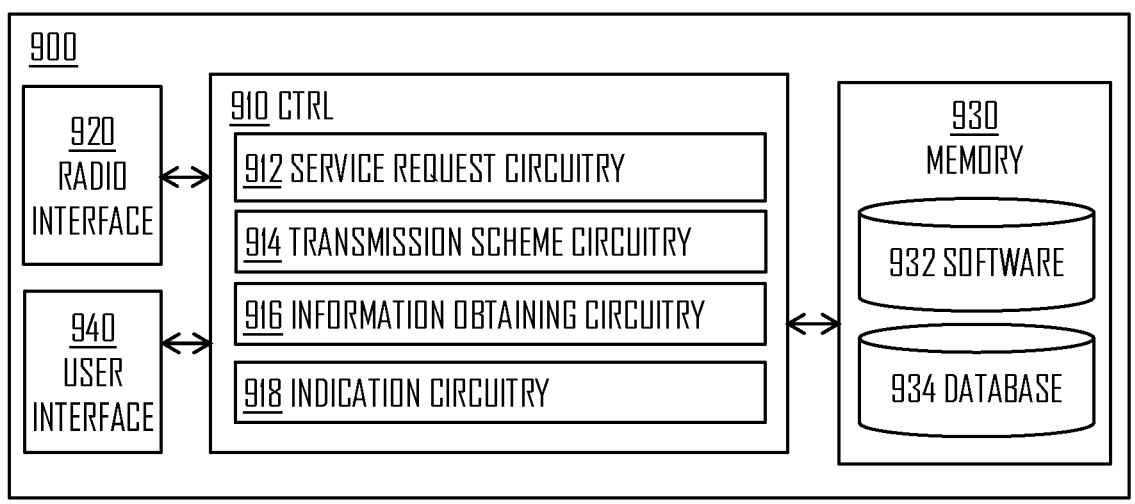
FIG. 9 illustrates a block diagram of an apparatus according to an embodiment.

FIG. 9 provides an apparatus 900 comprising a control circuitry (CTRL) 910, such as at least one processor, and at least one memory 930 including a computer program code (software) 932, wherein the at least one memory and the computer program code (software) 932, are configured, with the at least one processor, to cause the respective apparatus 900 to carry out any one of the embodiments of FIGS. 1 to 8, or operations thereof.

Referring to FIG. 9, the memory 930, may be implemented using any suitable data storage technology, such as semiconductor based memory devices, flash memory, magnetic memory devices and systems, optical memory devices and systems, fixed memory and removable memory. The memory 830, 930 may comprise a database 934 for storing data. For example, the UDR 302 data may be stored in the database 934.

The apparatus 900 may further comprise radio interface (TRX) 920 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas.

The apparatus 900 may comprise user interface 940 comprising, for example, at least one keypad, a microphone, a touch display, a display, a speaker, etc. The user interface 940 may be used to control the respective apparatus by a user of the apparatus 900.

In an embodiment, the apparatus 900 may be or be comprised in a network element, e.g. the network element performing the method described above (e.g. see FIG. 2). For example, the apparatus 900 may be or be comprised in the BDPFE 300.

Referring to FIG. 9, the control circuitry 910 may comprise a service request circuitry 912 configured to cause the apparatus 900 to perform at least operations of block 202; a transmission scheme circuitry 914 configured to cause the apparatus 900 to perform at least operations of block 204 and 210; an information obtaining circuitry 916 configured to cause the apparatus 900 to perform at least operations of block 206, 208 and 209; and an indication circuitry 918 configured to cause the apparatus 900 to perform at least operations of block 212.

In an embodiment, at least some of the functionalities of the apparatus 900 may be shared between two physically separate devices, forming one operational entity. Therefore, the apparatus 900 may be seen to depict the operational entity comprising one or more physically separate devices for executing at least some of the described processes. Thus, the apparatus 900 utilizing such shared architecture, may comprise a remote control unit (RCU), such as a host computer or a server computer, operatively coupled (e.g. via a wireless or wired network) to a remote radio head (RRH), such as a Transmission Point (TRP), located in a base station or network node 104, for example. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

According to an aspect there is provided a system comprising one or more apparatuses 900 and one or more terminal devices, such as sensor devices. The system may further comprise one or more network nodes for performing the multicast and unicast transmissions according to the transmissions scheme determined by the apparatus(es) 900.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 8 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 8, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A method in a network element of a wireless communication network, the method comprising:
    receiving a service request from a service provider;
    initiating determination of a transmission scheme for the service request;
    obtaining multicast capability information on a plurality of terminal devices and network nodes;
    obtaining distribution information on the plurality of terminal devices;
    obtaining traffic load information on the network nodes;
    based on the multicast capability information, the distribution information, and the traffic load information, determining the transmission scheme for the service request, the transmission scheme including at least one unicast transmission and at least one multicast transmission; and
    indicating one or more unicast transmitting entities about the at least one unicast transmissions and indicating one or more multicast transmitting entities about the at least one multicast transmissions.

2. The method of claim 1, wherein the service request is a firmware updating request or a software updating request.

3. The method of claim 1, wherein the plurality of terminal devices comprises vehicle sensor devices.

4. The method of claim 1, further comprising:
    causing the network node to apply multicast transmission in a cell provided by the network node if the number of terminal devices in the cell exceeds a threshold,
    otherwise causing the network node to apply one or more unicast transmission.

5. The method of claim 1, further comprising:
    configuring transmission times of the at least one unicast transmission and at least one multicast transmission based on traffic load information.

6. The method of claim 5, wherein transmission times of a unicast transmission and a multicast transmission are different.

7. The method of claim 1, wherein the distribution information includes trajectory information on the plurality of terminal devices.

8. The method of claim 1, wherein the method further comprises:
    continuously collecting and storing the capability information and distribution information;
    updating user profiles of the terminal devices in a database based on the collected information; and
    utilizing the user profiles in determining the transmission scheme.

9. An apparatus comprising:
    at least one processor; and
    at least one memory comprising a computer program code, wherein the at least one memory and the computer program code are configured, with the at least one processor, to cause a network element of a wireless communication network at least to perform:
    receiving a service request from a service provider;
    initiating determination of a transmission scheme for the service request;
    obtaining multicast capability information on a plurality of terminal devices and network nodes;
    obtaining distribution information on the plurality of terminal devices;
    obtaining traffic load information on the network nodes;
    based on the multicast capability information, the distribution information, and the traffic load information, determining the transmission scheme for the service request, the transmission scheme including at least one unicast transmission and at least one multicast transmission; and
    indicating one or more unicast transmitting entities about the at least one unicast transmissions and indicating one or more multicast transmitting entities about the at least one multicast transmissions.

10. The apparatus of claim 9, wherein the service request is a firmware updating request or a software updating request.

11. The apparatus of claim 9, wherein the plurality of terminal devices comprises vehicle sensor devices.

12. The apparatus of claim 9, wherein the at least one memory and the computer program code are further configured to cause the network element to perform:

causing the network node to apply multicast transmission in a cell provided by the network node if the number of terminal devices in the cell exceeds a threshold, otherwise causing the network node to apply one or more unicast transmission.

13. The apparatus of claim 9, wherein the at least one memory and the computer program code are further configured to cause the network element to perform:

configuring transmission times of the at least one unicast transmission and at least one multicast transmission based on traffic load information.

14. The apparatus of claim 13, wherein the transmission times of the unicast transmission and the multicast transmission are different.

15. The apparatus of claim 9, wherein the distribution information includes trajectory information on the plurality of terminal devices.

16. The apparatus of claim 15, wherein the trajectory information comprises information on predicted trajectories of the plurality of terminal devices.

17. The apparatus of claim 9, wherein the distribution information further comprises predicted location information on the plurality of terminal devices.

18. The apparatus of claim 9, wherein the at least one memory and the computer program code are further configured to cause the network element to perform:

continuously collecting and storing the capability information and distribution information;

updating user profiles of the terminal devices in a database based on the collected information; and utilizing the user profiles in determining the transmission scheme.

19. The apparatus of claim 9, wherein the network element utilizes one or more machine learning algorithms in determining the transmission scheme.

20. The apparatus of claim 19, wherein the one or more machine learning algorithms utilize neural networks.

21. A non-transitory computer readable medium comprising program instructions stored thereon for causing a network element of a wireless communication network at least to perform:

receiving a service request from a service provider;

initiating determination of a transmission scheme for the service request;

obtaining multicast capability information on a plurality of terminal devices and network nodes;

obtaining distribution information on the plurality of terminal devices;

obtaining traffic load information on the network nodes;

based on the multicast capability information, the distribution information, and the traffic load information, determining the transmission scheme for the service request, the transmission scheme including at least one unicast transmission and at least one multicast transmission; and indicating one or more unicast transmitting entities about the at least one unicast transmissions and indicating one or more multicast transmitting entities about the at least one multicast transmissions.

\* \* \* \* \*